(12) United States Patent
Eldar et al.

(10) Patent No.: US 7,831,997 B2
(45) Date of Patent: Nov. 9, 2010

(54) SECURE AND AUTOMATIC PROVISIONING OF COMPUTER SYSTEMS HAVING EMBEDDED NETWORK DEVICES

(75) Inventors: Avigdor Eldar, Jerusalem (IL); Moshe Valenci, Jeruselam (IL)

(73) Assignee: Intel Corporation, Santa Clara, CA (US)

( * ) Notice: Subject to any disclaimer, the term of this patent is extended or adjusted under 35 U.S.C. 154(b) by 1144 days.

(21) Appl. No.: 11/473,593

(22) Filed: Jun. 22, 2006

(65) Prior Publication Data

US 2007/0297396 A1  Dec. 27, 2007

(51) Int. Cl.
*G06F 15/16* (2006.01)
*H04L 29/06* (2006.01)

(52) U.S. Cl. .......................................... 726/3; 713/156
(58) Field of Classification Search ................. 713/201; 726/4, 5
See application file for complete search history.

(56) References Cited

U.S. PATENT DOCUMENTS

| 6,058,434 | A  | * | 5/2000  | Wilt et al. .................. 719/310 |
| 6,065,120 | A  | * | 5/2000  | Laursen et al. ................. 726/5 |
| 7,558,866 | B2 | * | 7/2009  | Choe et al. .................. 709/229 |
| 2002/0046293 | A1 | * | 4/2002  | Kabata et al. ............... 709/245 |
| 2003/0101243 | A1 | * | 5/2003  | Donahue et al. ............ 709/220 |
| 2004/0107366 | A1 | * | 6/2004  | Balfanz et al. .............. 713/201 |
| 2004/0268148 | A1 | * | 12/2004 | Karjala et al. ............... 713/201 |
| 2006/0174018 | A1 | * | 8/2006  | Zhu et al. .................... 709/229 |
| 2007/0147318 | A1 | * | 6/2007  | Ross et al. .................. 370/338 |
| 2007/0217344 | A1 | * | 9/2007  | Krywaniuk ................. 370/254 |
| 2007/0220122 | A1 | * | 9/2007  | Brown et al. ................ 709/220 |

OTHER PUBLICATIONS

INTEL; White Paper;Secure Provisioning for PCs with Intel® 945/ 955 Express Chipset and Intel® Active Management Technology. The link to download this paper is: http://www.intel.com/technology/manage/downloads/amt_provisioning.pdf. Sep. 2005; Revision 1.1; pp. 19.

* cited by examiner

*Primary Examiner*—Christopher A Revak
*Assistant Examiner*—Abdullah Almamun
(74) *Attorney, Agent, or Firm*—Garrett IP, LLC

(57) ABSTRACT

A provisioning method and mechanism for computer systems having embedded network devices. After an initial boot-up of a computer platform, an out-of-band (OOB) controller automatically connects to a corporate DHCP (Dynamic Host Configuration Protocol) server to obtain an IP (Internet Protocol) address and a domain name in which the computer platform is running. The domain name is concatenated with a pre-defined host name to obtain a FQDN (Fully Qualified Domain Name) for a provisioning server. The OOB controller then establishes a TCP connection to the provisioning server. A server certificate chain received from the provisioning server is validated. An attempt to login to the provisioning server is made. If corporate security policy dictates granting access to the computer platform, then provisioning configuration data is received over a secure and encrypted channel.

54 Claims, 3 Drawing Sheets

SECURE AND AUTOMATIC PROVISIONING OF COMPUTER SYSTEMS HAVING EMBEDDED NETWORK DEVICES

BACKGROUND OF THE INVENTION

1. Field of the Invention

The present invention is generally related to the field of embedded network devices. More particularly, the present invention is related to a secure and automatic provisioning method for computer systems having embedded network devices.

2. Description

Based on past experiences, provisioning of computer systems having embedded network devices requires a lot of attention and overhead to accomplish. Customers and OEMs (Original Equipment Manufacturers) desire a provisioning process that is as simple as possible, and ideally, without human intervention. The security of the provisioning process is a concern for customers and OEMs as well.

Thus, what is needed is a provisioning method for computer systems having embedded network devices that requires little or no human intervention. What is also needed is a provisioning method for computer systems having embedded network devices that not only requires little or no human intervention, but also provides the required security.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to provisioning methods for computer systems having embedded network devices. Embodiments of the present invention provide both an automatic and secure provisioning process that is inherently built into a platform. The process, called zero touch provisioning, is performed over corporate or public networks. Embodiments of the present invention provide mass provisioning of computer systems having embedded network devices with little or no manual configuration. Embodiments of the present invention further use digital signatures by $3^{rd}$ Party Root of Trusts to establish authentication of provisioning servers with no user intervention.

Although embodiments of the present invention are described as provisioning methods for computer systems having embedded network devices, such as, for example, an Intel® AMT (Active Management Technology) device manufactured by Intel Corporation in Santa Clara, Calif., the invention is not limited to AMT embedded network devices. One skilled in the relevant arts would know that other types of embedded network devices may also be provisioned using the methods described herein. Such devices may include, but are not limited to, BMC (Baseboard Management Controller) controllers, VT (Virtual Technology) partitions, and TPM (Trusted Platform Module).

Figure 1:
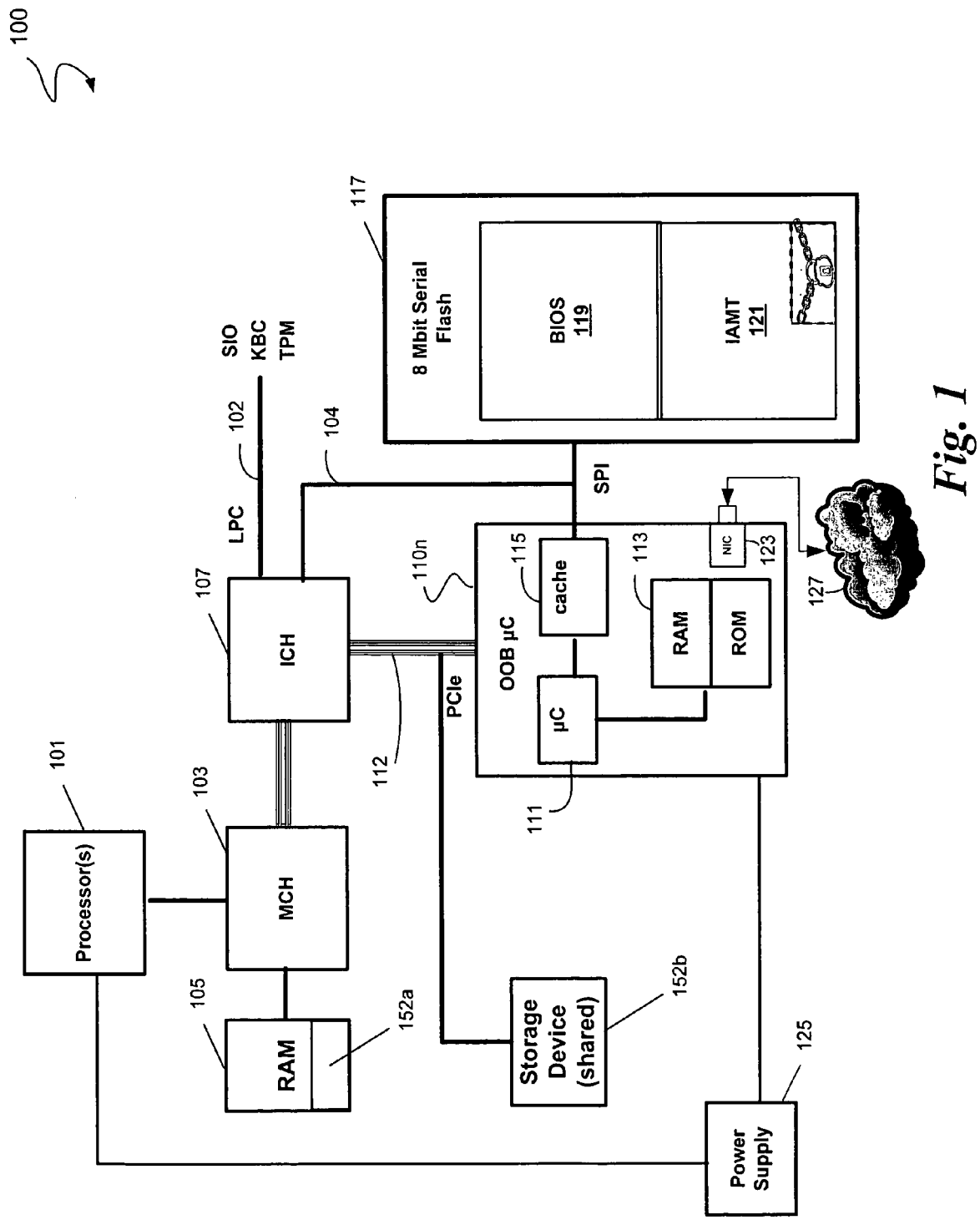
FIG. 1 is a block diagram illustrating an exemplary computer system having an embedded network device in which aspects of described embodiments may be employed.

FIG. 1 is a block diagram illustrating an exemplary computer system having an embedded network device in which aspects of described embodiments may be employed. A computer system 100 comprises a processor 101 (also known as an in-band processor). Processor 101 may be connected to random access memory 105 via a memory controller hub (MCH) 103. Processor 101 may be any type of processor capable of executing software, such as a microprocessor, digital signal processor, microcontroller, or the like. Although FIG. 1 shows only one such processor 101, there may be one or more processors in platform 100 and one or more of the processors may include multiple threads, multiple cores, or the like.

Processor 101 may be further connected to input/output (I/O) devices via an input/output controller hub (ICH) 107. ICH 107 may be coupled to various devices, such as, for example, a super I/O controller (SIO), a keyboard controller (KBC), and a trusted platform module (TPM) via a low pin count (LPC) bus 102. The SIO, for instance, may have access to floppy drives or industry standard architecture (ISA) devices. In an embodiment, ICH 107 is coupled to non-volatile memory via a serial peripheral interface (SPI) bus 104. The non-volatile memory may be flash memory or static random access memory (SRAM) or the like. Computer system 100 may also include an out-of-band (OOB) microcontroller 110. OOB microcontroller 110 may connect to ICH 107 via a bus 112, typically a peripheral component interconnect (PCI) or PCI express bus. OOB microcontroller 110 may also be coupled to a non-volatile memory store (NV store) 117 via SPI bus 104. NV store 117 may be flash memory or static RAM (SRAM), or the like. In many existing systems, NV store 117 is flash memory.

OOB microcontroller 110 may be operated to store a "message" containing a directive in a memory shared by OOB microcontroller 110 and processor 101. In the illustrated embodiment, processor 101 includes a shared memory 152 which is accessible by both processor 101 and OOB microcontroller 110. Shared memory 152 may reside in a reserved area 152a of RAM 105, or be located in a separate non-volatile memory store 152b, or the like. Shared memory 152 may be operated as a mailbox for these messages. Thus, in one aspect, OOB controller 110 may store a message in shared memory 152 or retrieve a message from shared memory 152 independently of the status of processor 101, including the operating system (OS) and any other programs operating on processor 101. Thus, in the illustrated embodiment, OOB microcontroller 110 may store or retrieve messages in shared memory 152 whether processor 101 is being initialized or is turned off, or whether the operating system is booting, running, crashed or otherwise. Shared memory 152 may be non-volatile (NV) memory such as flash memory or static random access memory (SRAM).

OOB microcontroller 110 operates independently of the operating system or any system start-up program, such that OOB microcontroller 110 may have its own dedicated control circuitry, firmware, operating system, etc. to control the operations of OOB microcontroller 110 independently of the status of the remainder of computer system 100. It is appreciated that the degree of operational independence of OOB microcontroller and other components may vary, depending upon the particular application.

OOB microcontroller 110 may be likened to a "miniature" processor. Like a full capability processor, OOB microcontroller 110 has a processor unit 111 which may be operatively coupled to a cache memory 115, as well as RAM (Random Access Memory) and ROM (Read Only Memory) memory 113. OOB microcontroller 110 may have an embedded network interface 123 and an independent connection to a power supply 125 to enable out-of-band communication even when in-band processor 101 is not active.

In embodiments, processor 101 has a basic input/output system (BIOS) 119 in NV store 117. In other embodiments, processor 101 may boot from a remote device (not shown), wherein the boot vector (pointer) resides in BIOS portion 119 of NV store 117. OOB microcontroller 110 may have access to all of the contents of NV store 117, including BIOS portion 119 and a protected portion 121 of non-volatile memory 117. In one embodiment, protected portion 121 of memory may be secured with Intel( Active Management Technology (AMT).

Since BIOS portion of non-volatile memory 117 may be modified by the OS or applications running within the OS, it is vulnerable to malicious tampering. Protected area 121 of NV store 117 is available only to OOB microcontroller 110, and therefore, may be used to store critical boot vector information without risk of tampering.

AMT enables IT (information Technology) to discover, heal, and protect networked computing assets using OOB platform capabilities and popular $3^{rd}$-party management and security applications. AMT stores hardware and software information in non-volatile memory, such as, for example, protected area 121 of NV store 117, and allows IT to "discover" the assets, even while computers are powered off. AMT provides out-of-band management capabilities, via out-of band microcontroller 110, that enable IT to remotely "heal" systems after OS (operating system) failures. Alerting and event logging help IT detect problems quickly to reduce downtime. AMT "protects" the network by keeping software and virus protection consistent and up-to-date across an enterprise. Third party software can store version numbers or policy data in non-volatile memory, such as, for example, protected area 121 of NV store 117, for off-hours retrieval and/or updates.

AMT deploys all of its capabilities in a safe and secure manner. The storage of hardware and software information in a persistent non-volatile storage, makes AMT resistant to tampering or accidental data loss. To ensure that only authorized users have access to critical features, and to protect against network attacks and/or technology misuse, AMT employs robust access control and privacy mechanisms. Such mechanisms include, but are not limited to, TLS (Transport Layer Security), HTTPS (Secure HTTP (HyperText Transfer Protocol)), and high quality session keys. TLS protocol is used to secure communications over OOB network interface 123. In one embodiment of the system, TLS implementation uses RSA keys, a public-key encryption technology developed by RSA (Rivest, Shamir, and Adelman) Data Security, Inc. HTTPS refers to the combination of a normal HTTP interaction over an encrypted secure socket layer (SSL) or Transport Layer Security (TLS) transport. HTTPS is used to authenticate operators and administrators during remote management of AMT systems. High quality session keys, generated using a pseudo random number generator in the firmware of the AMT system, are used for secure communications. Note that although the present invention is described using security protocols such as TLS and HTTPS, the invention is not limited to TLS and HTTPS. One skilled in the relevant art(s) would know that other types of Internet security protocols may be used as well.

In order to take best advantage of these security mechanisms, an AMT system (or any other system having an out-of-band microcontroller) must be carefully provisioned and implemented. When an AMT system is purchased from a PC vendor, and powered-on for the first time, it should be provisioned with all the data and technology resources required to configure AMT appropriately. This ensures that the full spectrum of AMT system manageability features can be used to manage the system. These technology resources include unique and secure user-ID and password, secret keys, access control lists, and public key certificates.

Figure 2:
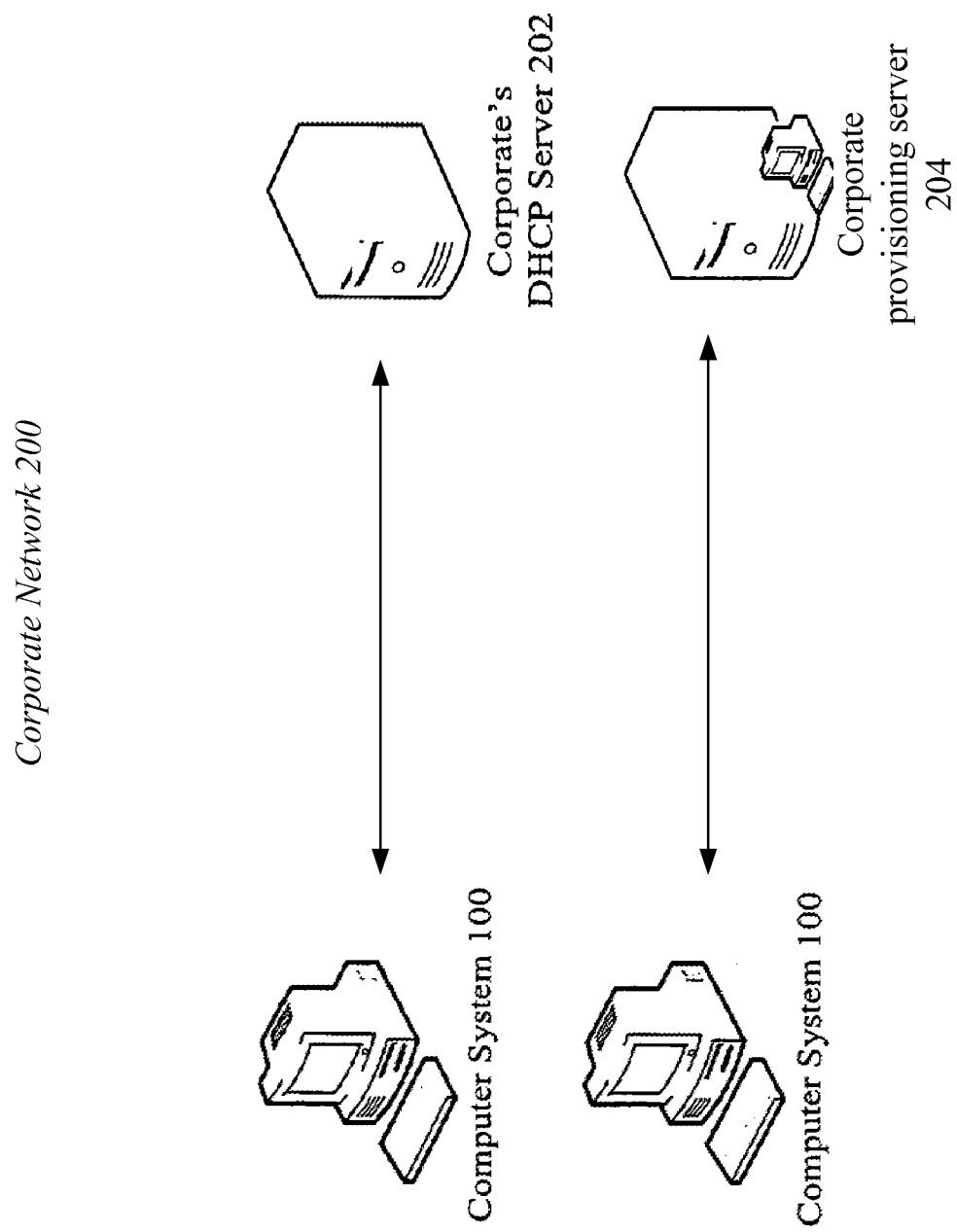
FIG. 2 is a block diagram illustrating corporate servers that a computer system having embedded network devices may need to interface with in order to perform a secure and automated provisioning process according to an embodiment of the present invention.

FIG. 2 is a block diagram illustrating corporate servers that a computer system having embedded network devices may need to interface with in order to perform the secure and automated provisioning process according to an embodiment of the present invention. FIG. 2 illustrates a computer system having embedded network devices, such as, for example, computer system 100, a corporate DHCP (Dynamic Host Configuration Protocol) server 202, and a corporate provisioning server 204. In order for the automatic provisioning process, also referred to as zero touch provisioning, to take place, computer system 100 must be able to automatically locate and connect to provisioning server 204. To locate provisioning server 204, computer system 100 may first connect to DHCP server 202 via OOB microcontroller 110. DHCP server 202 assigns dynamic IP (Internet Protocol) addresses to devices on a network. By connecting to DHCP server 202, computer system 100 may not only obtain an IP address, but may also sniff other information, such as, for example, but not limited to, domain name information. Using a predefined host name and the domain name information retrieved from the DHCP server 202 to obtain the FQDN (Fully Qualified Domain Name) for provisioning server 204, computer system 100, via OOB microcontroller 110, may connect to provisioning server 204 to begin the provisioning of computer system 100.

As indicated above, embodiments of the present invention are directed to a secure and automatic provisioning method for systems having secure embedded devices. The provisioning method, also referred to as "zero touch provisioning", requires little or no manual intervention by an IT technician or end user after booting up the system for the first time.

Prior to an enterprise receiving a computer system having an embedded network device, a list of $3^{rd}$ Party PKI (private key infrastructure) Root of Trust/Certificate vendors is placed in a flash image on the computer system, such as, for example, protected area 121 of NV store 117. In one embodiment, this occurs at a factory before the system has been deployed. For example, placing the list of 3$^{rd}$ Party PKI Root of Trust/ Certificate vendors may occur in an OEM (Original Equipment Manufacturer) manufacturing line. In another embodiment, this may occur when the image of the flash is being generated. Examples of 3$^{rd}$ Party PKI Root of Trust/Certificate vendors are, for example, VeriSign*, RSA, and any other provider of trust services for secure electronic communications on the Internet. This allows validation of a server certificate issued by one of the vendors on the list. Once the system has been assembled with the list of 3$^{rd}$ Party PKI Root of Trust/Certificate vendors incorporated on the AMT flash image, the system may be boxed for shipment to an enterprise.

Figure 3:
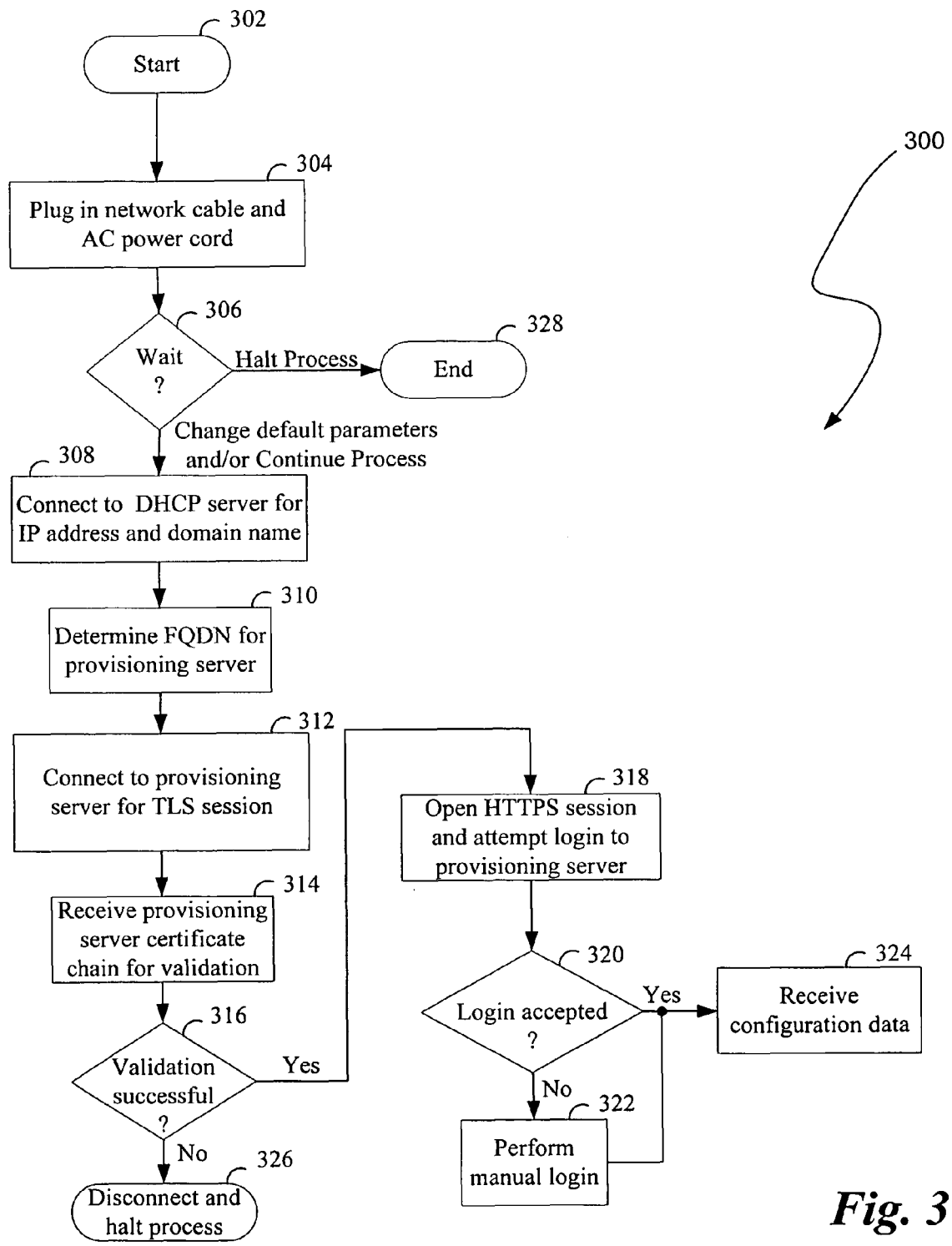
FIG. 3 is a flow diagram describing an exemplary provisioning method for a computer system having embedded network devices according to an embodiment of the present invention.

FIG. 3 is a flow diagram describing an exemplary provisioning method for a computer system having embedded network devices according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. Although diagram 300 is described in reference to provisioning a computer system having an embedded AMT device, one skilled in the relevant art(s) would know that other computer systems having OOB microcontrollers or other embedded network devices requiring intricate security provisioning may also use this automated process. The process begins with block 302, where the process immediately proceeds to block 304.

In block 304, once the computer system arrives at the desired destination, an IT technician or an end user will prepare the system for the provisioning process. In one embodiment, the IT technician or end user may optionally register unique information about the system in a corporate asset database. Such information may include, for example, the serial number and platform Universally Unique Identifier (UUID) as defined by the System Management Basic Input/ Output System (SMBIOS). After completing the optional registration process, the IT technician or end user may power-up the system by first plugging a power cord into computer system 100 and connecting the power cord to an AC (Alternating Current) power outlet. Prior to powering on computer system 100, a network or LAN (local area network) cable may also be connected to OOB microcontroller 110 of computer system 100 for network communications. The IT technician or end user may then power-on and boot-up computer system 100. The process then proceeds to block 306.

In block 306, during the initial boot sequence, the AMT device (or OOB microcontroller 110), via a BIOS (Basic Input/output System) level code, waits for a pre-determined time period before beginning zero touch provisioning. During the pre-determined time period, the IT technician or end user may opt to cancel the zero touch provisioning process, override default information, or continue the zero touch provisioning process. In an embodiment in which the IT technician or end user opts to cancel the zero touch provisioning process, the IT technician or end user may stop the process and perform manual provisioning, if desired (block 328). In an embodiment in which the IT or end user opts to override default information and provide other configuration data before starting the provisioning process, the IT technician can select this option, override some or all of the data by entering other configuration data through the local console, and then resume the automatic provisioning process. Some examples of data that may be overridden include, but are not limited to, username and password login information, an FQDN for the provisioning server, corporate root of trust information, etc. If the IT or end user wishes to proceed with zero touch provisioning without interruption of the system, the IT or end user may wait for the time period to elapse. In one embodiment, the time period may be 30 seconds. In another embodiment, the time period may be 45 seconds. In yet another embodiment, the time period may be 60 seconds. After the pre-determined time period has elapsed, the process proceeds to block 308, where zero touch provisioning begins.

In block 308, computer system 100, via OOB microcontroller 110, uses a LAN controller or NIC (network interface card) 123 to automatically connect to the corporation's DHCP server 202 via a LAN network 127. Once connected to the DHCP server 202, a DHCP handshake occurs. During the handshake, computer system 100 sends a request to DHCP server 202 for an IP address. DHCP server 202 returns a reply containing the IP address for computer system 100. Computer system 100 also learns additional information, such as, for example, the gateway, the DNS server address, and the domain name in which computer system 100 is running (e.g., intel.com, microsoft.com, etc.). The process then proceeds to block 310.

As previously indicated, in order to provision computer system 100, computer system 100 (via OOB microcontroller 110) has to connect to a corporate provisioning server to begin querying for information. In order for this to happen, computer system 100 must determine the FQDN of the provisioning server. Thus, in block 310, a predefined host name is concatenated with the domain name that was just sniffed over the Internet from DHCP server 202 (e.g., intercom, Microsoft.com, etc.) to obtain the fully qualified domain name (FQDN) for provisioning server 204. For example, a predefined host name, such as "amtprovisioning" is concatenated with the domain name "intel.com" to obtain the FQDN "amtprovisioning.intel.com". The process then proceeds to block 312.

In block 312, computer system 100, via OOB microcontroller 110, establishes a TCP connection to provisioning server 204 using the FQDN of provisioning server 204 and opens a TLS session. When the TLS session is created, provisioning server 204 returns a TLS server certificate chain, signed by a 3$^{rd}$ Party Root of Trust, identifying provisioning server 204 (block 314) for validation by computer system 100.

Server authentication is based on digital signatures of 3$^{rd}$ Party Public Certificate Authorities. Before certificates are signed by these authorities, the requester must provide proof of possession of the server's FQDN in which the certificate is to be issued. One of the requirements is that the requester be the owner of the Internet domain name.

In block 314, computer system 100 validates the incoming certificate chain based on the pre-configured 3$^{rd}$ Party Root of Trust list and the FQDN of provisioning server 204. During validation of the certificate chain, the chain's root certificate is checked for an internal match with one of the third party PKI Root of Trust vendors in the list that was incorporated into protected area 121 of NV store 117 prior to being deployed. Validation also requires a positive determination that the leaf certificate has been issued to provisioning server 204. For HTTPS, the requirement is that the subject's common name (CN) sub-field of the Subject field in the certificate specifies the FQDN of the provisioning server. Once provisioning server 204 has been validated by computer system 100, computer system 100 has authenticated the identity of provisioning server 204 and that its owner is indeed the corporation. This is an indication that the TLS session has been successfully opened.

In decision block 316, it is determined whether computer system 100 was able to validate the certificate chain received from provisioning server 204. If computer system 100 was unable to validate the certificate chain, the process proceeds to block 326, where computer system 100 may disconnect from provisioning server 204 and stop the zero touch provisioning process.

Returning to decision block 316, if computer system 100 was able to validate the certificate chain, then the process proceeds to block 318. In block 318, computer system 100 opens an HTTPS session and tries to login to provisioning server 204 using the UUID of computer system 100. The UUID of computer system 100 may be passed as an identification user password pair. While the UUID of computer system 100 is not publicly available at deployment, it cannot be considered a shared secret because there are no measures in place to keep it as such. The process then proceeds to decision block 320 for authentication of computer system 100 by provisioning server 204.

Note that authentication is based on the security policy of each corporation, which may vary from corporation to corporation. Corporations with high security policies, such as, for example, government agencies, may require manual entry of shared secret information when devices are provisioned over corporate or public networks. For other security environments, the level of protection available through zero touch provisioning may be sufficient.

In decision block 320, it is determined whether the corporate security policy will grant access to computer system 100 and accept the login information. If provisioning is to be performed on an isolated network, then provisioning server 204 will immediately grant access to computer system 100 and will use the UUID information to register computer system 100 in a non-disclosed database. For low to medium aware security corporations, the corporate policy may be to optionally validate the incoming UUID to the value the IT technician registered in the Asset Database in block 304. Provisioning server 204 would further verify that computer system 100 owning the UUID requires provisioning. For highly-aware security corporations, corporate policy may deny access and require login only with shared secret information that must be entered manually. In this instance, zero touch provisioning is changed to one-touch provisioning to allow the IT technician or end user to manually login to provisioning server 204 (block 322). The process then proceeds to block 324.

Returning to decision block 320, if computer system 100 has successfully logged-in to provisioning server 204, the process proceeds to block 324.

In block 324, provisioning server 204 may now download specific provisioning configuration data over a secured and encrypted HTTPS channel to computing system 100 and successfully complete the provisioning process.

Embodiments of the present invention may be implemented using hardware, software, or a combination thereof and may be implemented in one or more computer systems, as shown in FIG. 1, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include an in-band processor, an out-of-band processor, a storage medium (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A provisioning mechanism for computer systems comprising:
a computer platform having an in-band platform processor and an out-of-band (OOB) controller, a storage media, and a network interface, the storage media having a protected area only accessible to the controller, wherein initially booting up the computer platform causes the controller to:

automatically connect to a corporate DHCP (Dynamic Host Configuration Protocol) server to obtain an IP (Internet Protocol) address and a domain name;

concatenate the domain name with a pre-defined host name to obtain a FQDN (Fully Qualified Domain Name) for a provisioning server;

establish a TCP connection to the provisioning server using the FQDN to open a secure session;

validate a server certificate chain received from the provisioning server; and if the server certificate chain is validated, open a secure and encrypted session and attempt to login to the provisioning server, wherein if corporate security policy grants access to the computer platform, receive provisioning configuration data over a secured and encrypted channel, wherein the OOB controller is able to communicate when the in-band platform processor is not active.

2. The provisioning mechanism of claim 1, wherein to automatically connect to a corporate DHCP server to obtain an IP address and domain name includes to automatically send a request to the DHCP server for the IP address; to sniff for additional information, and to receive a reply from the DHCP server containing the IP address and additional information, including the domain name.

3. The provisioning mechanism of claim 1, wherein a $3^{rd}$-Party Root of Trust vendor list is incorporated into the protected area of the storage media prior to the initial boot-up of the computer platform, wherein to validate a server certificate chain comprises to check the server certificate chain's root certificate for an internal match with one of the $3^{rd}$ Party Root of Trust vendors from the $3^{rd}$ Party Root of Trust vendor list incorporated on the storage media and to determine that a leaf certificate of the certificate chain has been issued to the provisioning server.

4. The provisioning mechanism of claim 1, wherein to open a secure session comprises to open a TLS (Transport Layer security) session and wherein to validate a server certificate chain comprises to validate a TLS server certificate chain signed by a $3^{rd}$ Party Root of Trust.

5. The provisioning mechanism of claim 1, wherein to open a secure and encrypted session comprises to open an HTTPS (Secure HTTP (HyperText Transport Protocol)) session.

6. The provisioning mechanism of claim 1, further comprising a corporate asset database, wherein an IT technician or end-user to register unique information about the computer platform in the corporate asset database prior to the initial boot-up of the computer platform, the unique information comprising a serial number and a platform universally unique identifier (UUID).

7. The provisioning mechanism of claim 6, wherein to attempt to login to the provisioning server comprises to attempt to login to the provisioning server using the UUID of the computer platform as an identification user password pair.

8. The provisioning mechanism of claim 7, wherein the corporate security policy to grant access to the computer platform comprises to grant access to the computer platform when the UUID received at login matches the UUID in the corporate asset database when the computer platform was registered.

9. The provisioning mechanism of claim 1, further comprising an isolated network to perform provisioning of the computer platform, wherein the corporate security policy to grant immediate access to the computer platform to receive the provisioning configuration data over the isolated network.

10. The provisioning mechanism of claim 1, wherein the corporate security policy to grant access to the computer platform comprises to deny immediate access to the provisioning server until login with the shared secret information is entered manually.

11. The provisioning mechanism of claim 1, wherein if the server certificate chain was unable to be validated, the controller to disconnect from the provisioning server, wherein the computer platform to be manually provisioned.

12. The provisioning mechanism of claim 1, wherein the storage media comprises a flash memory or any other non-volatile storage media.

13. The provisioning mechanism of claim 1, wherein to validate a server certificate chain received from the provisioning server includes to verify that the certificate chain is issued to the owner of the FQDN.

14. The provisioning mechanism of claim 1, wherein the storage media further comprising a protected area only accessible to the controller.

15. A provisioning method for computer systems having embedded networked devices comprising:

on initial boot-up of a computer platform, connecting, via an out-of-band controller that is in the platform and distinct from man in-band platform processor, to a corporate DHCP (Dynamic Host Configuration Protocol) server to obtain an IP (Internet Protocol) address and a domain name in which the computer platform is running;

concatenating the domain name with a predefined host name to obtain a FQDN (Fully Qualified Domain Name) for a provisioning server;

establishing, via the controller, a TCP connection to the provisioning server;

validating a server certificate chain received from the provisioning server; and attempting to login to the provisioning server, wherein if corporate security policy dictates granting access to the computer platform, receiving provisioning configuration data over a secure and encrypted channel, wherein the OOB controller is able to communicate when the in-band platform processor is not active.

16. The provisioning method of claim 15, wherein connecting to a corporate DHCP server to obtain an IP address and domain name comprises:

sending a request for an IP address to the DHCP server;

receiving a reply containing the IP address; and sniffing for additional information; and receiving additional information, including the domain name.

17. The provisioning method of claim 15, wherein a $3^{rd}$ Party Root of Trust vendor list is incorporated into a protected area of the storage media in communication with the controller prior to the initial boot-up of the computer platform, wherein validating a server certificate chain comprises checking the server certificate chain's root certificate for an internal match with one of the $3^{rd}$ Party Root of Trust vendors from the $3^{rd}$ Party Root of Trust vendor list incorporated on the storage media.

18. The provisioning method of claim 17, wherein the storage media comprises a flash memory or any other non-volatile storage device.

19. The provisioning method of claim 15, wherein establishing a connection to the provisioning server further comprises opening a secure session.

20. The provisioning method of claim 19, wherein opening a secure session comprises opening a TLS (Transport Layer Security) session and wherein validating a server certificate comprises validating a TLS server certificate.

21. The provisioning method of claim 15, wherein validating a server certificate comprises validating the certificate chain's root certificate against a 3$^{rd}$ Party Root of Trust vendor list that was incorporated into a system flash of the computer platform prior to the initial boot-up and determining that a leaf certificate of the certificate chain has been issued to the provisioning server.

22. The provisioning method of claim 15, wherein attempting to login to the provisioning server comprises opening and HTTPS (Secure HTTP (HyperText Transport Protocol)) session and trying to login to provisioning server.

23. The provisioning method of claim 15, further comprising registering the computer platform and storing unique information about the computer platform and a corporate asset database, wherein the unique information comprises a serial number and a platform universally unique identifier (UUID).

24. The provisioning method of claim 23, wherein attempting to login to the provisioning server comprises attempting to login to the provisioning server using the UUID of the computer platform as an identification user password pair.

25. The provisioning method of claim 23, wherein corporate security policy dictates granting access to the computer platform if the incoming UUID is validated with a value of the UUID in the corporate asset database.

26. The provisioning method of claim 15, wherein corporate security policy dictates immediately granting access to the computer platform when an isolated network is used for provisioning.

27. The provisioning method of claim 15, wherein corporate security policy granting access to the computer platform comprises denying immediate access to the provisioning server until login with shared secret information is entered manually.

28. The provisioning method of claim 15, wherein if the provisioning server is unable to be validated, disconnecting from the provisioning server and manually performing provisioning of the computer platform.

29. A method for provisioning a computer system having an embedded networked devices comprising:
after a TCP connection has been established with an out-of-band (OOB) controller of a computer platform for provisioning, sending a server certificate chain to be validated;
if the server certificate chain is validated, receiving a login request over a secure and encrypted channel from the OOB controller;
determining whether to grant access to the OOB controller based on corporate security-based policy; and
if access is granted, automatically sending provisioning data to the OOB controller over the secure and encrypted channel,
wherein the OOB controller is able to communicate when an in-band platform processor in the computer platform is inactive.

30. The method of claim 29, wherein corporate security-based policy dictates that access be immediately granted to the OOB controller when an isolated network is used for provisioning.

31. The method of claim 29, wherein corporate security-based policy dictates that access be granted to the OOB controller when a UUID (universally unique identifier), received from the OOB controller during the login, is validated against a value for the UUID placed in a corporate asset database during registration of the computer platform.

32. The method of claim 29, wherein corporate security policy granting access to the computer platform comprises denying immediate access to the provisioning server until login with shared secret information is entered manually.

33. The method of claim 29, wherein sending a server certificate chain to be validated comprises sending a TLS (Transport Layer Security) server certificate during a TLS session.

34. The method of claim 29, wherein a secure and encrypted session comprises and HTTPS (Secure HTTP (HyperText Transport Protocol)) session, and a secure and encrypted channel comprises an HTTPS channel.

35. An article comprising: a storage device having a plurality of machine accessible instructions, wherein when the instructions are executed by a processor, the instructions provided for on initial boot-up of a computer platform,
connecting, via an out-of-band controller, distinct from an in-band platform processor in the computer platform, to a corporate DHCP (Dynamic Host Configuration Protocol) server to obtain an IP (Internet Protocol) address and a domain name in which the computer platform is running;
concatenating the domain name with a pre-defined host name to obtain a FQDN (Fully Qualified Domain Name) for a provisioning server;
establishing, via the OOB controller, a TCP connection to the provisioning server;
validating a server certificate chain received from the provisioning server; and
attempting to login to the provisioning server, wherein if corporate security policy dictates granting access to the computer platform, receiving provisioning configuration data over a secure and encrypted channel, wherein the OOB controller is able to communicate when the in-band platform processor is inactive.

36. The article of claim 35, wherein the instructions for connecting to a corporate DHCP server to obtain an IP address and domain name comprises instructions for:
sending a request for an IP address to the DHCP server;
receiving a reply containing the IP address; and
sniffing for additional information; and
receiving additional information, including the domain name.

37. The article of claim 35, wherein a 3$^{rd}$ Party Root of Trust vendor list is incorporated into a protected area of the storage media in communication with the controller prior to the initial boot-up of the computer platform, wherein validating a server certificate chain comprises instructions for checking the server certificate chain's root certificate for an internal match with one of the 3$^{rd}$ Party Root of Trust vendors from the 3$^{rd}$ Party Root of Trust vendor list incorporated on the storage media.

38. The article of claim 37, wherein the storage media comprises a flash memory or any other non-volatile memory device.

39. The article of claim 35, wherein the instructions for establishing a connection to the provisioning server further comprises instructions for opening a secure session.

40. The article of claim 39, wherein the instructions for opening a secure session comprises instructions for opening a TLS (Transport Layer Security) session and wherein instructions for validating a server certificate comprises instructions for validating a TLS server certificate.

41. The article of claim 35, wherein the instructions for validating a server certificate comprises instructions for validating the certificate chain's root certificate against a 3$^{rd}$ Party Root of Trust vendor list that was incorporated into a system flash of the computer platform prior to the initial boot-up and determining that a leaf certificate of the certificate chain has been issued to the provisioning server.

42. The article of claim 35, wherein the instructions for attempting to login to the provisioning server comprises instructions for opening an HTTPS (Secure HTTP (HyperText Transport Protocol)) session and trying to login to provisioning server.

43. The article of claim 35, further comprising instructions for registering the computer platform and storing unique information about the computer platform and a corporate asset database, wherein the unique information comprises a serial number and a platform universally unique identifier (UUID).

44. The article of claim 43, wherein instructions for attempting to login to the provisioning server comprises instructions for attempting to login to the provisioning server using the UUID of the computer platform as an identification user password pair.

45. The article of claim 43, wherein corporate security policy dictates granting access to the computer platform if the incoming UUID is validated with a value of the UUID in the corporate asset database.

46. The article of claim 35, wherein corporate security policy dictates immediately granting access to the computer platform when an isolated network is used for provisioning.

47. The article of claim 35, wherein corporate security policy granting access to the computer platform comprises instructions for denying immediate access to the provisioning server until login with shared secret information is entered manually.

48. The article of claim 35, wherein if the provisioning server is unable to be validated, further comprising instructions for disconnecting from the provisioning server and manually performing provisioning of the computer platform.

49. An article comprising: a storage device having a plurality of machine accessible instructions, wherein the instructions are executed by a processor, the instructions provide for after a TCP connection has been established with an out-of-band (OOB) controller of the computer platform for provisioning, sending a server certificate chain to be validated;
    if the server certificate chain is validated, receiving a login request over secure and encrypted channel from the OOB controller;
    determining whether to grant access to the OOB controller based on corporate security-based policy; and
    if access is granted, automatically sending provisioning data to the OOB controller over the secure and encrypted channel, wherein the processor is able to communicate with the OOB controller when an in-band platform processor on the computer platform is inactive.

50. The article of claim 49, wherein corporate security-based policy dictates that access be immediately granted to the OB controller when an isolated network is used for provisioning.

51. The article of claim 49, wherein corporate security-based policy dictates that access be granted to the OOB controller when a UUID (universally unique identifier), received from the OOB controller during the login, is validated against a value for the UUID placed in a corporate asset database during registration of the computer platform.

52. The article of claim 49, wherein corporate security policy granting access to the computer platform comprises instructions for denying immediate access to the provisioning server until login with shared secret information is entered manually.

53. The article of claim 49, wherein the instructions for sending a server certificate chain to be validated comprises instructions for sending a TLS (Transport Layer Security) server certificate during a TLS session.

54. The article of claim 49, wherein a secure and encrypted session comprises an HTTPS (Secure HTTP (HyperText Transport Protocol)) session, and a secure and encrypted channel comprises an HTTPS channel.

\* \* \* \* \*